(12) United States Patent
Dalal

(10) Patent No.: US 8,214,277 B2
(45) Date of Patent: Jul. 3, 2012

(54) MULTIDIMENSIONAL RISK ANALYSIS SYSTEMS

(76) Inventor: Pankaj B. Dalal, South Ozone Park, NY (US)

( * ) Notice: Subject to any disclaimer, the term of this patent is extended or adjusted under 35 U.S.C. 154(b) by 181 days.

(21) Appl. No.: 12/727,195

(22) Filed: Mar. 18, 2010

(65) Prior Publication Data

US 2010/0250465 A1 Sep. 30, 2010

Related U.S. Application Data

(60) Provisional application No. 61/276,305, filed on Sep. 9, 2009, provisional application No. 61/210,599, filed on Mar. 20, 2009.

(51) Int. Cl.
 *G06Q 40/00* (2012.01)
(52) U.S. Cl. ...................................... 705/36 R
(58) Field of Classification Search .................. None
 See application file for complete search history.

(56) References Cited

U.S. PATENT DOCUMENTS

| | | | |
|---|---|---|---|
| 6,012,046 A | 1/2000 | Lupien et al. | |
| 6,317,728 B1 | 11/2001 | Kane | |
| 6,907,404 B1 | 6/2005 | Li | |
| 7,046,248 B1 | 5/2006 | Perttunen | |
| 7,089,191 B2 | 8/2006 | Baron et al. | |
| 7,181,425 B1 | 2/2007 | Cha | |
| 7,243,083 B2 | 7/2007 | Burns et al. | |
| 7,356,499 B1 | 4/2008 | Amburn | |
| 7,356,501 B2 | 4/2008 | Churquina | |
| 7,392,214 B1 | 6/2008 | Fraser et al. | |
| 7,403,921 B2 | 7/2008 | Tanpoco et al. | |
| 7,925,561 B2 * | 4/2011 | Xu ............................ 705/36 R | |
| 2002/0069152 A1 | 6/2002 | B.C. et al. | |
| 2002/0069155 A1 | 6/2002 | Nafeh et al. | |
| 2002/0156719 A1 | 10/2002 | Finebaum et al. | |
| 2002/0184134 A1 | 12/2002 | Olsen et al. | |
| 2003/0004852 A1 | 1/2003 | Burns | |
| 2003/0009419 A1 | 1/2003 | Chavez et al. | |
| 2003/0149648 A1 | 8/2003 | Olsen et al. | |
| 2004/0128225 A1 | 7/2004 | Thompson et al. | |
| 2005/0075965 A1 | 4/2005 | Cutler | |
| 2005/0075966 A1 | 4/2005 | Duka | |
| 2005/0203825 A1 | 9/2005 | Angle et al. | |
| 2005/0228735 A1 | 10/2005 | Duquette | |
| 2005/0283422 A1 | 12/2005 | Myr | |
| 2006/0036542 A1 | 2/2006 | McNair | |
| 2006/0047590 A1 | 3/2006 | Anderson et al. | |
| 2006/0112001 A1 | 5/2006 | Perales | |
| 2006/0116943 A1 | 6/2006 | Willain | |
| 2006/0265320 A1 | 11/2006 | Duquette | |
| 2007/0022036 A1 | 1/2007 | Korzinin | |
| 2007/0043648 A1 | 2/2007 | Chait | |
| 2007/0156555 A1 | 7/2007 | Orr | |
| 2007/0162365 A1 | 7/2007 | Weinreb | |
| 2008/0319922 A1 | 12/2008 | Lawrence et al. | |
| 2009/0099978 A1 | 4/2009 | Manning et al. | |

FOREIGN PATENT DOCUMENTS

| | | |
|---|---|---|
| JP | 2006-172224 A | 6/2006 |
| JP | 2006-323534 A | 11/2006 |

OTHER PUBLICATIONS

The Banker Technology Awards 2003 Banker, Jun. 1, 2003, 7 pages.
The World at Your Fingertips Investor's Chronicle, Dec. 2005.

* cited by examiner

*Primary Examiner* — Olabode Akintola

(57) ABSTRACT

Multi-dimensional risk assessment in multiple time frames, capable of warning of upcoming risks and current risk levels in market trading without tedious manual confirmations.

20 Claims, 6 Drawing Sheets

| | Name | Symbol | Color |
|---|---|---|---|
| 1415 ✓ | Turquoise Bar + | ↑ | ▨ |
| 1420 ✓ | Turquoise Bar | ↑ | ▨ |
| 1425 ✓ | Golden Bar + | ↓ | ☐ |
| 1430 ✓ | Golden Bar | ↓ | ☐ |
| 1435 ✓ | Bull Belief Warning | ↑ | ▒ |
| 1440 ✓ | Bear Belief Warning | ↓ | ▩ |
| 1445 ✓ | Gray Bull | ↑ | ▓ |
| 1450 ✓ | Pink Bear | ↓ | ▒ |
| 1455 ✓ | Tdo Extended (+34) MHRIC Bear | ↓ | ▒ |
| 1480 ✓ | Tdo Extended (-34) MHRIC Bull | ↑ | ☐ |
| 1485 ✓ | Multi Dimensional Bull Entry | ↑ | ▨ |
| 1460 ✓ | Multi Dimensional Bear Entry | ↓ | ▥ |
| 1470 ✓ | Neutral Bar | ? | ■ |
| ✓ | Future Possible High | ⑩ | ▤ |
| 1475 ✓ | Future Possible Low | ⑨ | ▥ |

(1410 Name header)

FIG. 6

MULTIDIMENSIONAL RISK ANALYSIS SYSTEMS

CROSS-REFERENCE TO RELATED APPLICATION

The present application is related to and claims priority from prior provisional application Ser. No. 61/210,599, filed Mar. 20, 2009, entitled "Multi Confirmation Risk Assessment And Trading System", and is related to and claims priority from prior provisional application Ser. No. 61/276,305, filed Sep. 9, 2009, entitled "Multidimensional Risk Analysis Systems", the contents of which are incorporated herein by this reference and are not admitted to be prior art with respect to the present invention by the mention in this cross-reference section.

BACKGROUND

This invention relates to providing a system for improved risk assessment in market trading. More particularly, this invention relates to providing a system for risk assessment from multiple independent risk factors across multiple time frames.

In trading any market vehicle, over a period of time, technicians and economists seek to identify risks as early as possible. However, early pin-point detection, optimal sequencing, categorization, and confirmation of the risks are difficult in real-time (as they happen); this leads to delayed entry and exit in market trades. Further, multiple confirmations of risks delay entries and exits in market trades even longer.

A system is needed to identify and confirm risks in real-time, as the risks develop. Further, a system is needed that will identify and confirm risks in user-desired time frames and at any stage of a trend.

OBJECTS AND FEATURES OF THE INVENTION

A primary object and feature of the present invention is to provide a system overcoming the above-mentioned problems and needs.

It is a further object and feature of the present invention to provide such a system that provides assessment of the multiple risks, inherent in market trading.

Another object and feature of the present invention is to provide such a system that confirms risks in multiple time frames.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a computer method, relating to real-time market analysis, comprising the steps of: processing, by at least one computer, at least one real-time market feed to determine real-time market data; automatically calculating, by such at least one computer, current values of each of a plurality of market risk factors from such real-time market data; real-time analyzing, by such at least one computer, at least one combination of such market risk factors to quantify at least one market risk; assessing relevance, by such at least one computer, of each quantity of a plurality of such at least one market risks to determine when to display at least one risk indicator; and displaying, by such at least one computer, such at least one risk indicator. Moreover, it provides such a computer method further comprising the step of displaying, by such at least one computer, at least some of such current values of such plurality of market risk factors. Additionally, it provides such a computer method further comprising the step of calculating, by such at least one computer, each of such plurality of market risk factors relating to each of a plurality of time frames ending at about current real-time.

Also, it provides such a computer method further comprising the step of displaying, relating to each of such plurality of time frames, at least some of such current values of such plurality of market risk factors, by such at least one computer. In addition, it provides such a computer method wherein such step of automatically calculating, by such at least one computer, current values of each of a plurality of market risk factors comprises the step of automatically calculating, by such at least one computer, current values of at least one historic value range boundary risk factor. And, it provides such a computer method wherein such step of automatically calculating, by such at least one computer, current values of each of a plurality of market risk factors comprises the step of automatically calculating, by such at least one computer, current values of at least one time-duration risk factor. Further, it provides such a computer method wherein such step of automatically calculating, by such at least one computer, current values of each of a plurality of market risk factors comprises the step of automatically calculating, by such at least one computer, current values of at least one trend health risk factor.

Even further, it provides such a computer method wherein such step of automatically calculating, by such at least one computer, current values of each of a plurality of market risk factors comprises the step of automatically calculating, by such at least one computer, current values of at least one price-perception risk factor. Moreover, it provides such a computer method wherein such step of automatically, by such at least one computer, calculating current values of each of a plurality of market risk factors comprises the step of automatically calculating, by such at least one computer, current values of at least one internal-market-movement risk factor. Additionally, it provides such a computer method wherein such step of automatically calculating, by such at least one computer, current values of each of a plurality of market risk factors comprises the step of automatically calculating, by such at least one computer, current values of at least one economic-event risk factor.

Also, it provides such a computer method wherein such step of automatically calculating, by such at least one computer, current values of each of a plurality of market risk factors comprises the step of automatically calculating, by such at least one computer, current values of at least one multiple condition risk factor. In addition, it provides such a computer method wherein such step of automatically calculating, by such at least one computer, current values of each of a plurality of market risk factors comprises at least two of the following steps: automatically calculating, by such at least one computer, current values of at least one historic value range boundary risk factor; automatically calculating, by such at least one computer, current values of at least one time-duration risk factor; automatically calculating, by such at least one computer, current values of at least one trend health risk factor; price-perception computer risk processor means for automatically calculating, by such at least one computer, current values of at least one price-perception risk factor; automatically calculating, by such at least one computer, current values of at least one internal-market-movement risk factor; automatically calculating, by such at least one computer, current values of at least one economic-event risk factor; and automatically calculating, by such at least one computer, current values of at least one multiple condition risk factor.

In accordance with another preferred embodiment hereof, this invention provides a computer system, relating to real-time market analysis, comprising: at least one market feed computer processor structured and arranged to process at least one real-time market feed to determine real-time market data; at least one risk factor computer processor structured and arranged to automatically calculate current values of each of a plurality of market risk factors from such real-time market data; at least one analysis computer processor structured and arranged to real-time analyze at least one combination of such market risk factors to quantify at least one market risk; at least one risk assessing computer processor structured and arranged to assess relevance of each quantity of a plurality of such at least one market risks to determine when to display at least one risk indicator; and at least one risk indicator computer display structured and arranged to display such at least one risk indicator.

And, it provides such a computer system further comprising at least one risk factor computer display structured and arranged to display at least some of such current values of such plurality of market risk factors. Further, it provides such a computer system further comprising at least one time-frame computer processor structured and arranged to calculate each of such plurality of market risk factors relating to each of a plurality of time frames ending at about current real-time. Even further, it provides such a computer system further comprising at least one time-frame computer display structured and arranged to display, relating to each of such plurality of time frames, at least some of such current values of such plurality of market risk factors. Moreover, it provides such a computer system wherein such at least one risk factor computer processor comprises at least one bounded range risk computer processor structured and arranged to automatically calculate current values of at least one historic value range boundary risk factor.

Additionally, it provides such a computer system wherein such at least one analysis computer processor analyzes at least one combination of such current values of such at least one historic value range boundary risk factor to determine when to display at least one historic value range boundary risk indicator. Also, it provides such a computer system wherein such at least one risk factor computer processor comprises at least one time-duration risk computer processor structured and arranged to automatically calculate current values of at least one time-duration risk factor. In addition, it provides such a computer system wherein such at least one analysis computer processor analyzes at least one combination of such current values of such at least one time-duration risk factor to determine when to display at least one historic value range boundary risk indicator. And, it provides such a computer system wherein such at least one risk factor computer processor comprises at least one trend health risk computer processor structured and arranged to automatically calculate current values of at least one trend health risk factor. Further, it provides such a computer system wherein such at least one analysis computer processor analyzes at least one combination of such current values of such at least one trend health risk factor to determine when to display at least one trend health risk indicator. Even further, it provides such a computer system wherein such at least one risk factor computer display comprises at least one summation of at least one count of positively showing of such plurality of market risk factors and at least one negative count of negatively showing of such plurality of market risk factors.

Moreover, it provides such a computer system wherein such at least one risk factor computer processor comprises at least one price-perception risk computer processor structured and arranged to automatically calculate current values of at least one price-perception risk factor. Additionally, it provides such a computer system wherein such at least one analysis computer processor analyzes at least one combination of such current values of such at least one price-perception risk factor to determine when to display at least one price-perception risk indicator. Also, it provides such a computer system wherein such at least one risk factor computer processor comprises at least one internal-market-movement risk computer processor structured and arranged to automatically calculate current values of at least one internal-market-movement risk factor. In addition, it provides such a computer system wherein such at least one analysis computer processor analyzes at least one combination of such current values of at least one internal-market-movement risk factor to determine when to display such at least one internal-market-movement risk indicator.

And, it provides such a computer system wherein such at least one risk factor computer processor comprises economic-event risk computer processor structured and arranged to automatically calculate current values of at least one economic-event risk factor. Further, it provides such a computer system wherein such at least one analysis computer processor analyzes at least one combination of such current values of such at least one economic-event risk factor to determine when to display at least one economic-event risk indicator. Even further, it provides such a computer system wherein such at least one risk factor computer processor comprises at least one multiple-conditions risk computer processor structured and arranged to automatically calculate current values of at least one multiple condition risk factor. Moreover, it provides such a computer system wherein such at least one analysis computer processor analyzes at least one combination of such current values of such at least one multiple-conditions risk factor to determine when to display at least one multiple-conditions risk indicator.

Additionally, it provides such a computer system wherein such at least one risk factor computer processor comprises at least two of the following: at least one bounded range risk computer processor structured and arranged to automatically calculate current values of at least one historic value range boundary risk factor; at least one time-duration risk computer processor structured and arranged to automatically calculate current values of at least one time-duration risk factor; at least one trend health risk computer processor structured and arranged to automatically calculate current values of at least one trend health risk factor; at least one price-perception computer risk processor structured and arranged to automatically calculate current values of at least one price-perception risk factor; at least one internal-market-movement risk computer processor structured and arranged to automatically calculate current values of at least one internal-market-movement risk factor; at least one economic-event risk computer processor structured and arranged to automatically calculate current values of at least one economic-event risk factor; and at least one multiple-conditions risk computer processor structured and arranged to automatically calculate current values of at least one multiple condition risk factor.

In accordance with another preferred embodiment hereof, this invention provides a computer system, relating to real-time market analysis, comprising: market feed computer processor means for processing at least one real-time market feed to determine real-time market data; risk factor computer processor means for automatically calculating current values of each of a plurality of market risk factors from such real-time market data; analysis computer processor means for real-time analyzing at least one combination of such market risk factors to quantify at least one market risk; risk assessing computer processor means for assessing relevance of each quantity of a plurality of such at least one market risks to determine when to display at least one risk indicator; and risk indicator computer display means for displaying such at least one risk indicator.

Also, it provides such a computer system further comprising risk factor computer display means for displaying at least some of such current values of such plurality of market risk factors. In addition, it provides such a computer system further comprising time-frame computer processor means for calculating each of such plurality of market risk factors relating to each of a plurality of time frames ending at about current real-time. And, it provides such a computer system further comprising time-frame computer display means for displaying, relating to each of such plurality of time frames, at least some of such current values of such plurality of market risk factors. Further, it provides such a computer system wherein such risk factor computer processor means comprises bounded range risk computer processor means for automatically calculating current values of at least one historic value range boundary risk factor.

Even further, it provides such a computer system wherein such risk factor computer processor means comprises time-duration risk computer processor means for automatically calculating current values of at least one time-duration risk factor. Even further, it provides such a computer system wherein such risk factor computer processor means comprises trend health risk computer processor means for automatically calculating current values of at least one trend health risk factor. Even further, it provides such a computer system wherein such risk factor computer processor means comprises price-perception computer risk processor means for automatically calculating current values of at least one price-perception risk factor. Even further, it provides such a computer system wherein such risk factor computer processor means comprises internal-market-movement risk computer processor means for automatically calculating current values of at least one internal-market-movement risk factor. Even further, it provides such a computer system wherein such risk factor computer processor means comprises economic-event risk computer processor means for automatically calculating current values of at least one economic-event risk factor.

Even further, it provides such a computer system wherein such risk factor computer processor means comprises multiple-conditions risk computer processor means for automatically calculating current values of at least one multiple condition risk factor. Even further, it provides such a computer system wherein such risk factor computer processor means comprises at least two of the following: bounded range risk computer processor means for automatically calculating current values of at least one historic value range boundary risk factor; time-duration risk computer processor means for automatically calculating current values of at least one time-duration risk factor; trend health risk computer processor means for automatically calculating current values of at least one trend health risk factor; price-perception computer risk processor means for automatically calculating current values of at least one price-perception risk factor; internal-market-movement risk computer processor means for automatically calculating current values of at least one internal-market-movement risk factor; economic-event risk computer processor means for automatically calculating current values of at least one economic-event risk factor; and multiple-conditions risk computer processor means for automatically calculating current values of at least one multiple condition risk factor.

In accordance with another preferred embodiment hereof, this invention provides a computer system, relating to real-time market analysis, comprising: market feed computer processing means for processing at least one real-time market feed to determine real-time market data; multiple time frame computer interface means for assisting user selection of multiple time frames ending at about current real-time; risk assessing computer processor means for assessing risk with respect to each of multiple market turnaround risk factors; analysis computer processor means for real-time analyzing a combination of such multiple market turnaround risk factors with respect to such real-time market data; risk factor computer processor means for automatically determining each of such multiple market turnaround risk factors; risk factor computer interface means for displaying each such determining of such multiple market turnaround risk factors; wherein such risk factor computer interface means comprises time-frame computer interface means for displaying, for each such user-selected time-frame, each such market turnaround risk factors.

Moreover, it provides such a computer system wherein such risk factor computer processor means comprises bounded range risk computer processor means for automatically determining at least one historic value range boundary risk factor. Additionally, it provides such a computer system wherein such risk factor computer processor means comprises time-duration risk computer processor means for automatically determining at least one time-duration risk factor. Also, it provides such a computer system wherein such risk factor computer processor means comprises trend health risk computer processor means for automatically determining at least one trend health risk factor. In addition, it provides such a computer system wherein such risk factor computer processor means comprises price-perception computer risk processor means for automatically determining at least one price-perception risk factor. And, it provides such a computer system wherein such risk factor computer processor means comprises internal-market-movement risk computer processor means for automatically determining at least one internal-market-movement risk factor. Further, it provides such a computer system wherein such risk factor computer processor means comprises economic-event risk computer processor means for automatically determining at least one economic-event risk factor. Even further, it provides such a computer system wherein such risk factor computer processor means comprises multiple-conditions risk computer processor means for automatically determining at least one multiple condition risk factor.

Moreover, it provides such a computer system wherein such risk factor computer processor means comprises at least two of the following: bounded range risk computer processor means for automatically determining at least one historic value range boundary risk factor; time-duration risk computer processor means for automatically determining at least one time-duration risk factor; trend health risk computer processor means for automatically determining at least one trend health risk factor; price-perception computer risk processor means for automatically determining at least one price-perception risk factor; internal-market-movement risk computer processor means for automatically determining at least one internal-market-movement risk factor; economic-event risk computer processor means for automatically determining at least one economic-event risk factor; and multiple-conditions risk computer processor means for automatically determining at least one multiple condition risk factor. In accordance with another preferred embodiment hereof, this invention provides a computer system, relating to real-time market analysis, comprising: at least one market feed computer processor structured and arranged to process at least one real-time market feed to determine real-time market data; at least one multiple time frame computer interface structured and arranged to assist user selection of multiple time frames ending at about current real-time; at least one risk assessing computer processor structured and arranged to assess risk with respect to each of multiple market turnaround risk factors; at least one analysis computer processor structured and arranged to real-time analyze a combination of such multiple market turnaround risk factors with respect to such real-time market data; at least one risk factor computer processor structured and arranged to automatically determine each of such multiple market turnaround risk factors; at least one risk factor computer interface structured and arranged to display each such determining of such multiple market turnaround risk factors; wherein such at least one risk factor computer interface comprises at least one time-frame computer interface structured and arranged to display, in each such user-selected time-frame, each such market turnaround risk factors. Additionally, it provides such a computer system wherein such at least one risk factor computer processor comprises at least one bounded range risk computer processor structured and arranged to automatically determine at least one historic value range boundary risk factor.

Also, it provides such a computer system wherein such at least one risk factor computer processor comprises at least one time-duration risk computer processor structured and arranged to automatically determine at least one time-duration risk factor. In addition, it provides such a computer system wherein such at least one risk factor computer processor comprises at least one trend health risk computer processor structured and arranged to automatically determine at least one trend health risk factor. And, it provides such a computer system wherein such at least one risk factor computer interface displays at least one summation of at least one count of positively showing of such multiple market turnaround risk factors and at least one negative count of negatively showing of such multiple market turnaround risk factors. Further, it provides such a computer system wherein such at least one risk factor computer processor comprises at least one price-perception computer risk processor structured and arranged to automatically determine at least one price-perception risk factor.

Even further, it provides such a computer system wherein such at least one risk factor computer processor comprises at least one internal-market-movement risk computer processor structured and arranged to automatically determine at least one internal-market-movement risk factor. Even further, it provides such a computer system wherein such at least one risk factor computer processor comprises economic-event risk computer processor structured and arranged to automatically determine at least one economic-event risk factor. Even further, it provides such a computer system wherein such at least one risk factor computer processor comprises at least one multiple-conditions risk computer processor structured and arranged to automatically determine at least one multiple condition risk factor.

Even further, it provides such a computer system wherein such at least one risk factor computer processor comprises at least two of the following: at least one bounded range risk computer processor structured and arranged to automatically determine at least one historic value range boundary risk factor; at least one time-duration risk computer processor structured and arranged to automatically determine at least one time-duration risk factor; at least one trend health risk computer processor structured and arranged to automatically determine at least one trend health risk factor; at least one price-perception computer risk processor structured and arranged to automatically determine at least one price-perception risk factor; at least one internal-market-movement risk computer processor structured and arranged to automatically determine at least one internal-market-movement risk factor; at least one economic-event risk computer processor structured and arranged to automatically determine at least one economic-event risk factor; and at least one multiple-conditions risk computer processor structured and arranged to automatically determine at least one multiple condition risk factor. In accordance with another preferred embodiment hereof, this invention provides for each and every novel feature, element, combination, step and/or method disclosed or suggested by this patent application.

BRIEF DESCRIPTION OF THE DRAWINGS

FIG. 6 shows a screenshot view, illustrating internal movement indicators, according to the preferred embodiment of FIG. 1.

DETAILED DESCRIPTION OF THE BEST MODES AND PREFERRED EMBODIMENTS OF THE INVENTION

Figure 1:
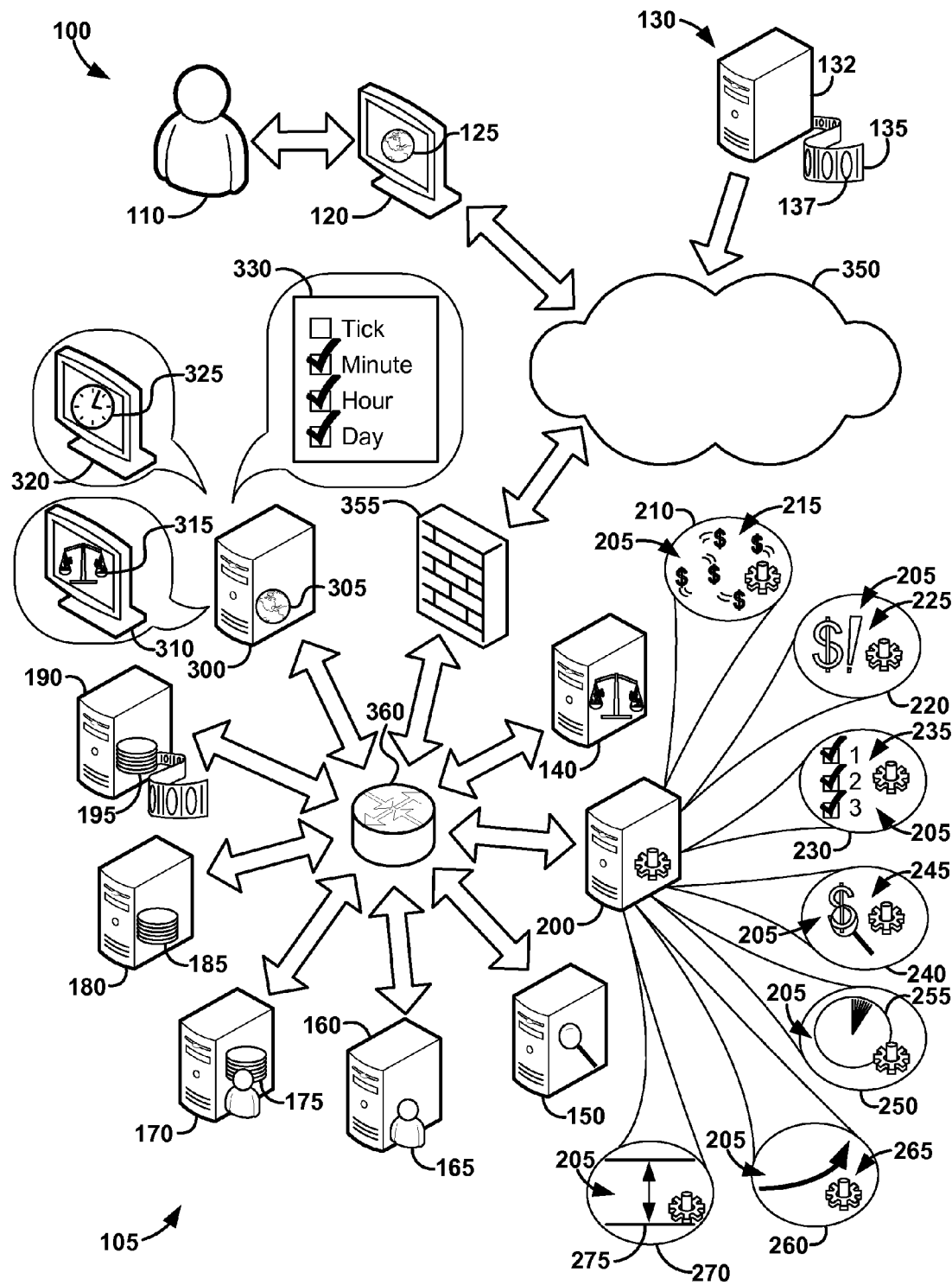
FIG. 1 shows a schematic view, illustrating a multidimensional risk analysis system, according to a preferred embodiment of the present invention.

FIG. 1 shows a schematic view, illustrating a multidimensional risk analysis system 100, according to a preferred embodiment of the present invention. Multidimensional risk analysis system 100 shows an internet method for obtaining market data 137. Multidimensional risk analysis system 100 preferably comprises at least one market-data processing center 105 preferably comprising at least one market-feed database server 190. Market-feed database server 190 preferably comprises at least one market-feed database 195. Market-feed database server 190 preferably receives at least one market data feed 135, from at least one market feed provider 130, preferably by communicating with at least one market feed server 132. Market data feed 135 preferably comprises market data 137, relating to trade markets. Market data 137 is preferably stored in market-feed database 195. Upon reading the teachings of this specification, those skilled in the art will now appreciate that, under appropriate circumstances, considering such issues as costs, future technologies, etc., other methods of obtaining market data, such as, for example, direct connection, website extraction, etc., may suffice.

Communication between market-feed database server 190 (at least embodying herein at least one market feed computer processor structured and arranged to process at least one real-time market feed to determine real-time market data; and at least embodying herein processing at least one real-time market feed to determine real-time market data) and market feed server 132 preferably is conducted through at least one network 355, preferably the Internet 350. At least one firewall 355 preferably secures communication with Internet 350, preferably to prevent unsanctioned access to market-data processing center 105. Upon reading the teachings of this specification, those skilled in the art will now appreciate that, under appropriate circumstances, considering such issues as future technologies, costs, etc., other communication securing methods, such as, for example, encryption, security gateways, etc., may suffice.

Communication within market-data processing center 105 is preferably handled through at least one communications router 360. Upon reading the teachings of this specification, those skilled in the art will now appreciate that, under appropriate circumstances, considering such issues as future technologies, cost, etc., other communications devices, such as, for example, direct connections, wireless connections, etc., may suffice.

Market-data processing center 105 preferably comprises at least one programmable market data software, preferably Metastock® Pro (available from Equis.com). Market-data processing center 105 preferably further comprises at least one risk processor 200, preferably at least one risk assessor 140, preferably at least one risk analyzer 150, and preferably at least one history database server 180.

Risk processor 200 (at least embodying herein at least one risk factor computer processor structured and arranged to automatically calculate current values of each of a plurality of market risk factors from such real-time market data; and at least embodying herein automatically calculating current values of each of a plurality of market risk factors from such real-time market data) preferably processes market data 137, preferably identifying portions of market data 137 related to at least one market risk 205. In discussing "market risk" herein, applicant is generally referring to the particular risks of performing a particular trade at a particular time. Risk analyzer 150 (at least embodying herein at least one analysis computer processor structured and arranged to real-time analyze at least one combination of such market risk factors to quantify at least one market risk; and at least embodying herein real-time analyzing at least one combination of such market risk factors to quantify at least one market risk) preferably analyzes the identified portions of market data 137, preferably identifying risk attributes, preferably direction and severity, of market risk 205. Risk processor 200 and risk analyzer 150 preferably both operate in real-time (as market data 137 is received by market-feed database server), and process and analyze, respectively, preferably in multiple time frames 325. Upon reading the teachings of this specification, those skilled in the art will now appreciate that, under appropriate circumstances, considering such issues as future technologies, costs, resources, etc., other risk attribute identifications may suffice.

Risk assessor 140 (at least embodying herein at least one risk assessing computer processor structured and arranged to assess relevance of each quantity of a plurality of such at least one market risks to determine when to display at least one risk indicator; and at least embodying herein assessing relevance of each quantity of a plurality of such at least one market risks to determine when to display at least one risk indicator) preferably creates at least one risk assessment 315, preferably comprising at least one evaluation of at least one risk factor determining whether at least one level of risk is reached, preferably triggering at least one display of the at least one level of risk, preferably comprising at least one indicator 500 (see FIG. 2 through FIG. 6). Indicator 500 preferably indicates the identified direction and severity of market risk 205. Risk assessment 315 preferably comprises indicators 500 from multiple market risks 205, preferably in multiple timeframes 325 (at least embodying herein at least one time-frame computer processor structured and arranged to calculate each of such plurality of market risk factors relating to each of a plurality of time frames ending at about current real-time; and at least embodying herein calculating each of such plurality of market risk factors relating to each of a plurality of time frames ending at about current real-time), preferably ending at about current time. Upon reading the teachings of this specification, those skilled in the art will now appreciate that, under appropriate circumstances, considering such issues as future technologies, costs, etc., other risk assessments, such as, for example, market vehicle interrelationship risks, common industry risks, company relationship risks, etc., may suffice.

History database server 180 preferably comprises at least one history database 185. History database 185 preferably stores results from risk processor 200 and risk analyzer 150. Risk assessor 140 preferably accesses history database 185, preferably to include indicators 500, referencing market risks 205 previously identified, in risk assessment 315. Upon reading the teachings of this specification, those skilled in the art will now appreciate that, under appropriate circumstances, considering such issues as future technologies, costs, etc., other data history storage, such as, for example, rotating buffers, flat files, period specific reports, etc., may suffice.

Market-data processing center 105 preferably further comprises at least one user server 160, at least one user database server 170, and at least one user interface server 300. At least one user 110 preferably may utilize user server 160, user database server 170 and user interface server 300 to interact with market-data processing center 105.

User interface server 300 preferably provides at least one user interface 305 for use by user 110. User interface 305 preferably comprises at least one risk assessment display 310, at least one time frame display 320 and at least one display preference interface 330. Display preference interface 330 preferably allows user 110 to set preferences for display of time frames 325 and risk assessments 315.

User 110 preferably uses at least one user computer 120, preferably having at least one client user interface 125, preferably a web browser, to connect to user interface 305. Upon reading the teachings of this specification, those skilled in the art will now appreciate that, under appropriate circumstances, considering such issues as cost, future technologies, etc., other software architectures, such as, for example, client server applications, stand-alone applications, etc., may suffice.

Risk assessment display 310 (at least embodying herein at least one risk indicator computer display structured and arranged to display such at least one risk indicator; and at least embodying herein displaying such at least one risk indicator) and time frame display 320 preferably display risk assessment 315 and time frames 325, respectively, to user 110. Risk assessment display 310 (at least embodying herein at least one risk factor computer display structured and arranged to display at least some of such current values of such plurality of market risk factors; and at least embodying herein displaying at least some of such current values of such plurality of market risk factors) preferably also displays at least some of the results from risk processor 200. Risk assessment display 310 and at least one time frame display 320 are preferably combined for comparison by user 110. Upon reading the teachings of this specification, those skilled in the art will now appreciate that, under appropriate circumstances, considering such issues as future technologies, user preference, costs, etc., other processed data distribution methods, such as, for example, email alerts, outbound data feeds, instant messages, text messages, etc., may suffice.

User server 160 preferably controls authentication to market-data processing center 105 preferably using at least one user account 165. User 110, having user account 165, may login to market-data processing center 105, using at least one username and password combination, through user server 160. Upon reading the teachings of this specification, those skilled in the art will now appreciate that, under appropriate circumstances, considering such issues as cost, future technologies, etc., other authentication methods, such as, for example, key-code, file authenticators, etc., may suffice.

User database server 170 preferably comprises at least one user database 175. User database 175 preferably stores information for user account 165, including the preferences set by user 110 with display preference interface 330. Upon reading the teachings of this specification, those skilled in the art will now appreciate that, under appropriate circumstances, considering such issues as costs, future technologies, etc., other data storage methods, such as, for example, flat files, client-side storage, etc., may suffice.

Risk processor 200 preferably comprises at least one internal market moving risk processor 210, at least one economic event risk processor 220, at least one multiple conditions risk processor 230, at least one price perception risk processor 240, at least one time duration risk processor 250, at least one trend risk processor 260, and at least one zone range risk processor 270. Under appropriate circumstances, Applicant prefers using a combination of at least some of the described risk processors; alternately preferably, each other combination of at least some of the described risk processors. Upon reading the teachings of this specification, those skilled in the art will now appreciate that, under appropriate circumstances, considering such issues as future market influences, future technologies, available data, etc., other risk processors, such as, for example, non-economic event risk processors, newsfeed risk processors, industry-family risk processors, company-family risk processors, etc., may suffice.

In use, multidimensional risk analysis system 100 preferably provides, in risk assessment 315, a representation of the travel of current market vehicle prices while demonstrating various market risks 205 in a multi-dimensional risk spectrum. Risk assessment 315 also preferably presents multiple confirmations of market risks 205, preferably in multiple time frames 325.

Each market risk 205 has preferably no direct dependence on other market risks 205; while ideally this non-dependence is complete, market risks 205 may have indirect influences on one another. During the movement of any market vehicle, movement of a market vehicle is subject to various risk dimensions (market risks 205) that the applicant categorizes in seven major dimensions (seven market risks 205), namely: vertical risk dimension (zone range risk 275); horizontal time risk (time duration risk 255); trend health risk 265; dynamic sectional price risk (price perception risk 245); sudden market spot change risk (internal market moving risk 215); Special conditional risk (multiple conditions risk 235); fundamental risk (economic event risk 225).

Risk processor 200 preferably independently processes each market risk 205. Consequently, internal market moving risk processor 210 (at least herein embodying wherein said at least one risk factor computer processor comprises at least one internal-market-movement risk computer processor structured and arranged to automatically calculate current values of at least one internal-market-movement risk factor; and at least herein embodying wherein such step of automatically calculating current values of each of a plurality of market risk factors comprises the step of automatically calculating current values of at least one internal-market-movement risk factor) preferably processes internal market moving risk 215, economic event risk processor 220 (at least herein embodying wherein said at least one risk factor computer processor comprises economic-event risk computer processor structured and arranged to automatically calculate current values of at least one economic-event risk factor; and at least herein embodying wherein such step of automatically calculating current values of each of a plurality of market risk factors comprises the step of automatically calculating current values of at least one economic-event risk factor) preferably processes economic event risk 225, multiple conditions risk processor 230 (at least herein embodying wherein said at least one risk factor computer processor comprises at least one multiple-conditions risk computer processor structured and arranged to automatically calculate current values of at least one multiple condition risk factor; and at least herein embodying wherein such step of automatically calculating current values of each of a plurality of market risk factors comprises the step of automatically calculating current values of at least one multiple condition risk factor) preferably processes multiple conditions risk 235, price perception risk processor 240 (at least herein embodying wherein said at least one risk factor computer processor comprises at least one price-perception risk computer processor structured and arranged to automatically calculate current values of at least one price-perception risk factor; and at least herein embodying wherein such step of automatically calculating current values of each of a plurality of market risk factors comprises the step of automatically calculating current values of at least one price-perception risk factor) preferably processes price perception risk 245, time duration risk processor 250 (at least herein embodying wherein said at least one risk factor computer processor comprises at least one time-duration risk computer processor structured and arranged to automatically calculate current values of at least one time-duration risk factor; and at least herein embodying wherein such step of automatically calculating current values of each of a plurality of market risk factors comprises the step of automatically calculating current values of at least one time-duration risk factor) preferably processes time duration risk 255, trend risk processor 260 (at least herein embodying wherein said at least one risk factor computer processor comprises at least one trend health risk computer processor structured and arranged to automatically calculate current values of at least one trend health risk factor; and at least herein embodying wherein such step of automatically calculating current values of each of a plurality of market risk factors comprises the step of automatically calculating current values of at least one trend health risk factor) preferably processes trend health risk 265, and zone range risk processor 270 (at least herein embodying wherein said at least one risk factor computer processor comprises at least one bounded range risk computer processor structured and arranged to automatically calculate current values of at least one historic value range boundary risk factor; and at least embodying herein wherein such step of automatically calculating current values of each of a plurality of market risk factors comprises the step of automatically calculating current values of at least one historic value range boundary risk factor) preferably processes zone range risk 275.

Figure 2:
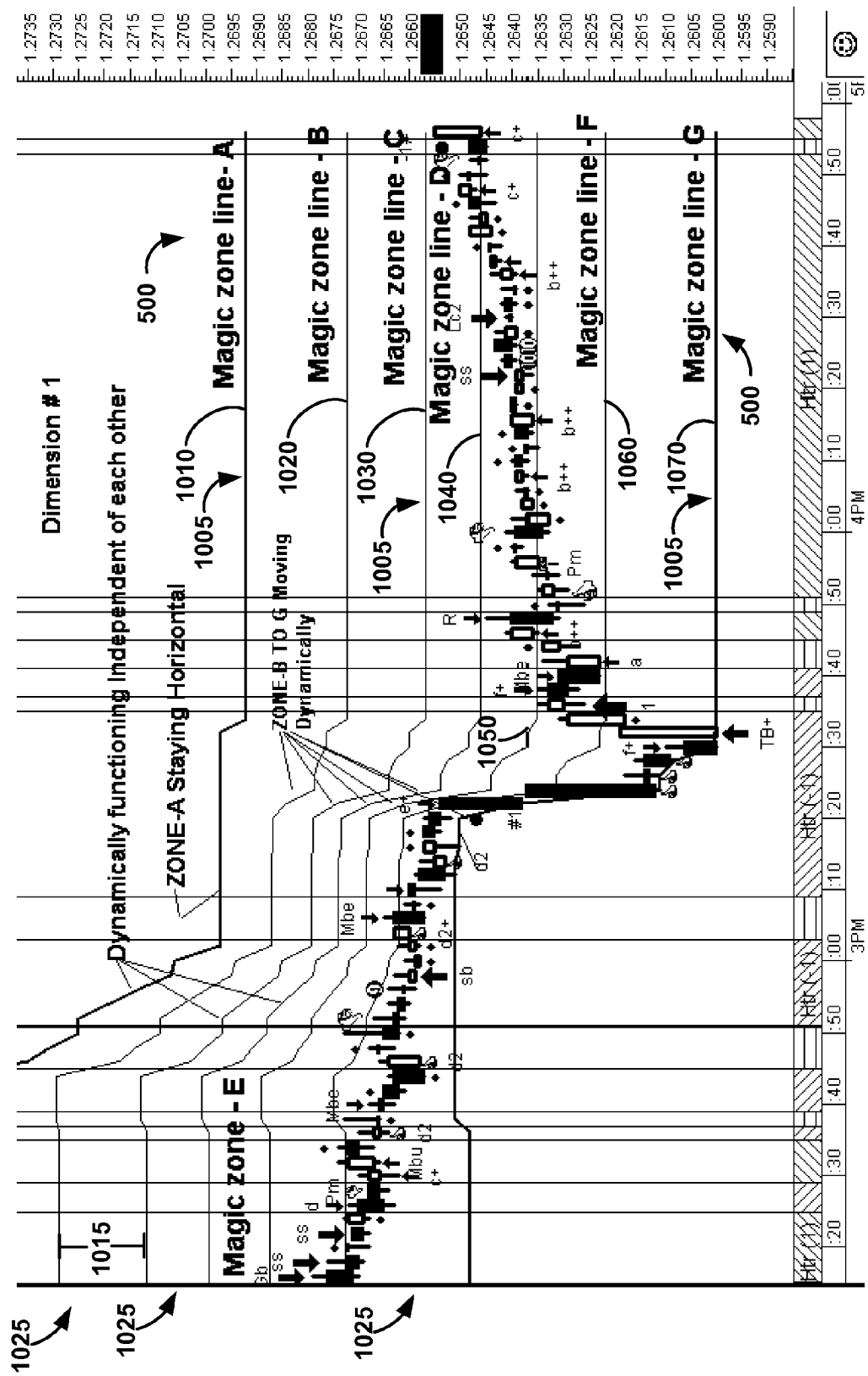
FIG. 2 shows a screenshot view, illustrating vertical risk dimensions, according to the preferred embodiment of FIG. 1.

FIG. 2 shows a screenshot view, illustrating vertical risk dimensions, according to the preferred embodiment of FIG. 1. In the vertical risk dimension (zone range risk 275), indicators 500 preferably comprise at least two dynamic zone lines 1005, preferably at least seven dynamic zone lines 1005, as shown in FIG. 2. Upon reading the teachings of this specification, those skilled in the art will now appreciate that, under appropriate circumstances, considering such issues as cost, market dynamics, future statistical methods, etc., other dynamic zone line quantities, such as, for example, nine, twelve, twenty, etc., may suffice.

Dynamic zone lines 1005 preferably comprise zone line 1010, zone line 1020, zone line 1030, zone line 1040, zone line 1050, zone line 1060 and zone line 1070, preferably determined in a statistical manner, preferably by applying a Fibonacci analysis. Upon reading the teachings of this specification, those skilled in the art will now appreciate that, under appropriate circumstances, considering such issues as desired accuracy, future technologies, cost, etc., other quantities of dynamic zone lines may suffice.

Any market vehicle comprises zone range risk 275 preferably comprising an upward or downward movement, when compared to a reference point, over a period of time. Zone range risk 275 preferably moves dynamically as market conditions change and can be divided into multiple zones by dynamic zone lines 1005, depending upon the accuracy required. Zone range risk 275 preferably is contained between an upper zone line (zone line 1010) and a lower zone line (zone line 1070). Zone range risk 275 preferably is dynamically adjusted, preferably when market conditions are going to change.

Zone range risk 275 preferably identifies the risk associated with any market vehicle, by its location between its highest recent position and its lowest position, preferably over designated periods, preferably in a dynamic motion. Zone range risk 275 preferably may be subdivided into seven major dynamic zones lines 1005, as shown, for recent activities. Upon reading the teachings of this specification, those skilled in the art will now appreciate that, under appropriate circumstances, considering such issues as predictive beliefs, cost, etc., other zone lines, such as, for example, higher zone lines, lower zone lines, subdividing zone lines, etc., may suffice. Vertical distances (illustrated by distance 1015) between any two zone lines 1005 preferably comprise at least one risk zone 1025.

The dynamic changes on any zone line 1005 preferably indicate possible changes in the near future, which further indicate possible lower prices or higher prices for a market vehicle, depending upon the direction of the change. A key indication is that one of either uppermost zone line (zone line 1010) or lowermost zone line (zone line 1070) must be steady and other zone lines vary to higher levels or lower levels compared to previous zone levels. After initial movement of the seven zone lines in one direction, while one of either uppermost or lowermost zone levels remains steady, one of the uppermost or lowermost zone lines will start moving and at one time all seven levels will move in one direction and establish either new higher or new lower prices in the market. In many cases, zone lines 1005 will make a trough formation first, before making such new higher prices or new lower prices compared to previous periods under consideration. The smaller the period selection, the more such events occur.

Traditional factors such as Fib (Fibonacci) levels, pivot levels or combination of both or some specialty levels, possible by mathematic formula, may be used for zone lines 1005. In other words, the new methodology for Dimension #1 (zone range risk 275) is preferably flexible and adaptable to existing methods for a smooth transition in future.

Due to dynamic nature of market, these Magic zone levels (zone lines 1005) or distance 1015 preferably is dynamically adjusted as changes occur, without the traditional limitations of Fib levels or pivot levels. In addition, zone lines 1005 preferably move independent of each other showing true level of risk areas from one to another. It is not necessary to have a constant distance between all zone levels. More zone lines 1005 may preferably be added by changing designated periods, preferably mixing zones 1025 to see earlier changes in market than even a fixed period for all zones 1025. Additionally, several calculations of zone lines 1005 may preferably be mixed to find an average zone level price, alternately preferably may be combined to derive additional zone lines 1005. An algorithm may also be used, preferably to bring the values of zone lines 1005 from other time frames 325, preferably superimposing other zone lines 1005 from other time frames 325, preferably to create an effect of multiple time frame zone lines for efficient trading.

In use, levels (zone lines 1005) may be created using higher high values and lower low values over a period of time for any market vehicle and can be interjected with any traditional methods of establishing levels; these interjections can be designated as hybrid zone levels. So, this concept of zones 1025 will eliminate traditional use of Pivots and Fibonacci levels and their limitations in trading. In addition, zone lines 1005 will eliminate the use of two indicators separately and will produce a better dynamic tool for traders. There is a great confusion for traders in selecting, which highs or lows may be selected in applying Fib levels and applicant's herein described embodiment eliminates that confusion. Applicant's embodiment preferably permits designing zone lines 1005 using different time periods for higher high values and lower low values.

The travel of current prices through these various zone lines or zones along with Applicant's dynamic multi-colored candle collection and various dimensional risks create a multi-dimensional risk spectrum. Further, zone lines 1005 are preferably designed for shorter duration, alternately preferably medium duration, alternately preferably long term duration, alternately preferably super long duration as per choice of user 110. Separate indicators 500 are preferably designed for each type of choice.

Zone range risk 275 may preferably be represented in real time using the following type of formula:

$$1-A+(30)$$

where 1 is indicating that the current prices (either open, close, high, low—user choice) are above zone line A (zone line 1010). The plus sign, as shown in formula, shows above zone line prices. A minus sign, in place of the shown plus sign, shows below zone line prices. The (30) indicates a distance of 30 points to the next zone line. For bullish entry, the risk is substantial; the next zone level A is 30 points away from current price.

Figure 3:
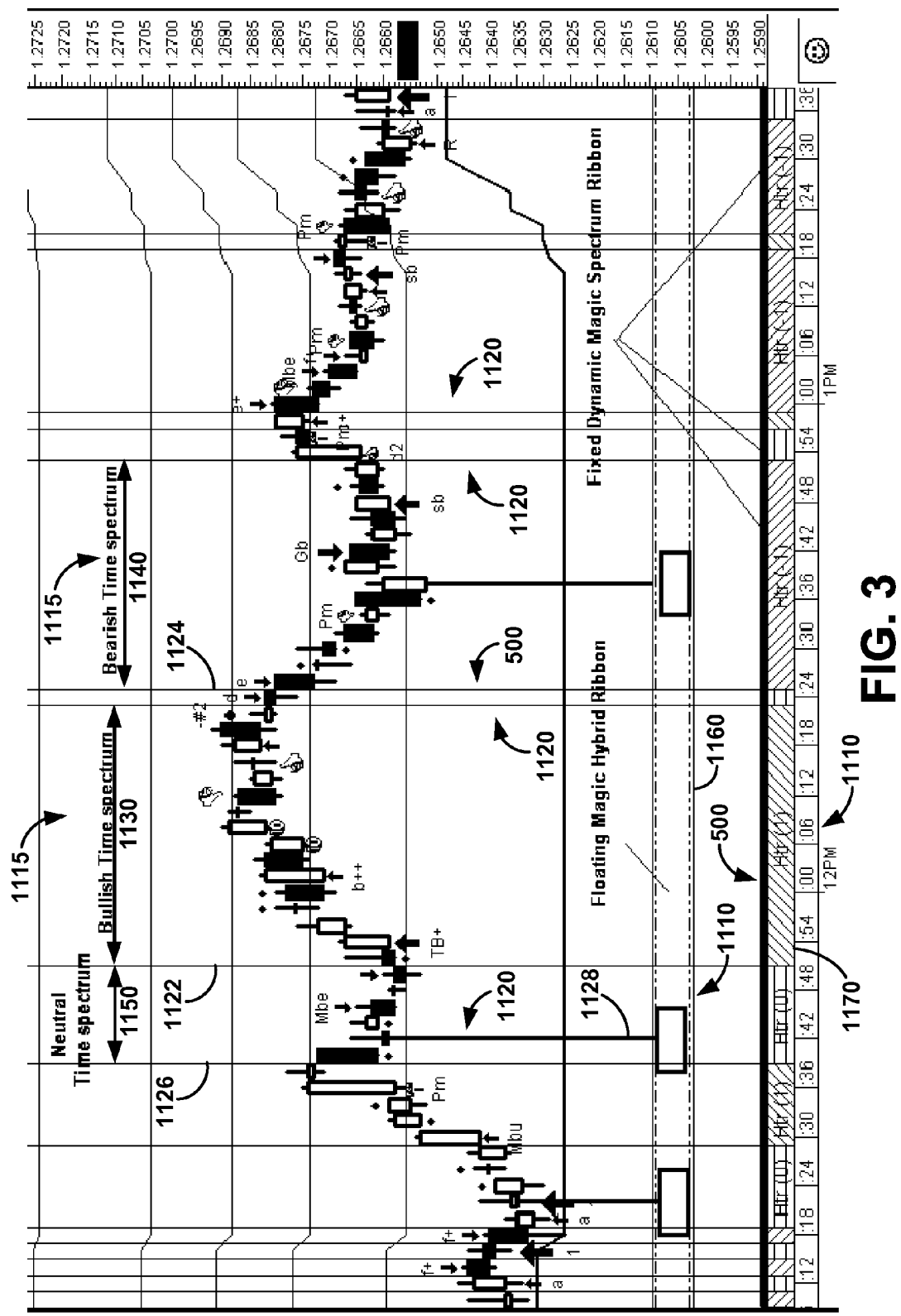
FIG. 3 shows a screenshot view, illustrating horizontal time risk dimensions, according to the preferred embodiment of FIG. 1.

FIG. 3 shows a screenshot view, illustrating horizontal time risk dimensions, according to the preferred embodiment of FIG. 1. In the horizontal time risk dimension (time duration risk 255), indicators 500 preferably comprise at least one time spectrum ribbon 1110. Time spectrum ribbon 1110 preferably comprises at least one time spectrum segment 1115, preferably at least one bullish time spectrum segment 1130, alternately preferably at least one bearish time spectrum segment 1140, alternately preferably at least one neutral time spectrum segment 1150, as shown. Upon reading the teachings of this specification, those skilled in the art will now appreciate that, under appropriate circumstances, considering such issues as user preference, cost, etc., other time spectrum segments, such as, for example, partial bull time spectrum segments, partial bear time spectrum segments, etc., may suffice.

In trading, user 110 needs to find an exact location and a time spectrum (indicated through time spectrum segment 1115), in any time frame 325, in real time, where there is a maximum possibility of either bullish stepping desire or bearish stepping desire and there is a mix of desire for bullish or bearish stepping or no stepping desire. There is a horizontal time risk dimension (time duration risk 255) associated in trading during the formation of a time spectrum, preferably with indicators 500 comprising bullish time spectrum segment 1130, bearish time spectrum segment 1140 and neutral time spectrum segment 1150, preferably indicating bullish desire, bearish desire, or mix of desire for bullish or bearish situations, respectively. The longer the time spectrum segment forms, the greater the risk for any type of desire.

Time duration risk 255 preferably is represented by multiple time spectrum ribbons 1110. At least one fixed time spectrum ribbon 1170 preferably represents time duration risk 255 of a time frame 325, currently displayed. Additionally, at least one floating time spectrum ribbon 1160 is preferably used to represent at least one hybrid of time duration risk from other time frames 325 (at least embodying herein at least one time-frame computer display structured and arranged to display, relating to each of such plurality of time frames, at least some of such current values of such plurality of market risk factors; and at least embodying herein displaying, relating to each of such plurality of time frames, at least some of such current values of such plurality of market risk factors), alternately preferably from previous time frames 325.

Fixed time spectrum ribbon 1170 preferably comprises at least one time risk line 1120. Each time risk line 1120 preferably comprises a time risk bullish line 1122, alternately preferably a time risk bearish line 1124, alternately preferably a time risk neutral line 1126, or alternately preferably a time risk hybrid line 1228. Time risk line 1120 preferably comprises at least one indicator color (not shown) for distinguishing between time risk bullish line 1122, time risk bearish line 1124, time risk neutral line 1126, and time risk hybrid line 1228.

For a bullish horizontal time risk, time risk bullish line 1122 comprises a vertical line preferably drawn before the beginning of a bullish horizontal time risk actual time frame either candle or bar, as shown. Time risk bullish line 1122 is preferably always followed by either bearish time spectrum segment 1140 or neutral time spectrum segment 1150.

For a bearish horizontal time risk, time risk bearish line 1124 comprises a vertical line preferably drawn before the beginning of a bearish horizontal time risk actual time frame either candle or bar, as shown. Time risk bearish line 1124 is always followed by either bullish time spectrum segment 1130 or neutral time spectrum segment 1150.

For a neutral horizontal time risk, time risk neutral line 1126 comprises a vertical line preferably drawn before the beginning of a Neutral Horizontal Time risk actual time frame either candle or bar, as shown. Time risk neutral line 1126 is always followed by either bullish time spectrum segment 1130 or bearish time spectrum segment 1140.

Time risk hybrid line 1228 preferably comprises a vertical line drawn thru a candle or a bar, when a sudden event occurs in the market, due to dimension risk #5 (internal market moving risk 215), in floating time spectrum ribbon 1160, as shown.

Indicators 500 for time duration risk 255 preferably pinpoint at least one location, when real increasing bullish stepping desire, real increasing bearish stepping desire or mix stepping or no stepping desires exist in the market, along with multiple confirmations represented by colored candles or bars representations.

An algorithm is preferably be created using confirmed swing locations in either direction in trading, comparing higher stepping desire values with previous higher stepping desire values, comparing lower stepping desire values with previous stepping lower desire values, the number of bars since these events have occurred, the highest values of stepping swings, and the lowest values of stepping swings. Upon reading the teachings of this specification, those skilled in the art will now appreciate that, under appropriate circumstances, considering such issues as cost, user preference, etc., other indicators, such as, for example, PSSTOCH, moving averages, lag-less averages, directional indicators, money flow, CCI, etc., may be injected.

Time duration risk 255 is preferably represented in real time using the following type of formula:

$$2 - \text{Htr}(1) \quad [5]$$

where 2 is indicating that the current prices (either open, close, high, low—according to user choice) are in a bullish horizontal risk. [5] indicates, the bullish horizontal risk is five time frames old.

Figure 4:
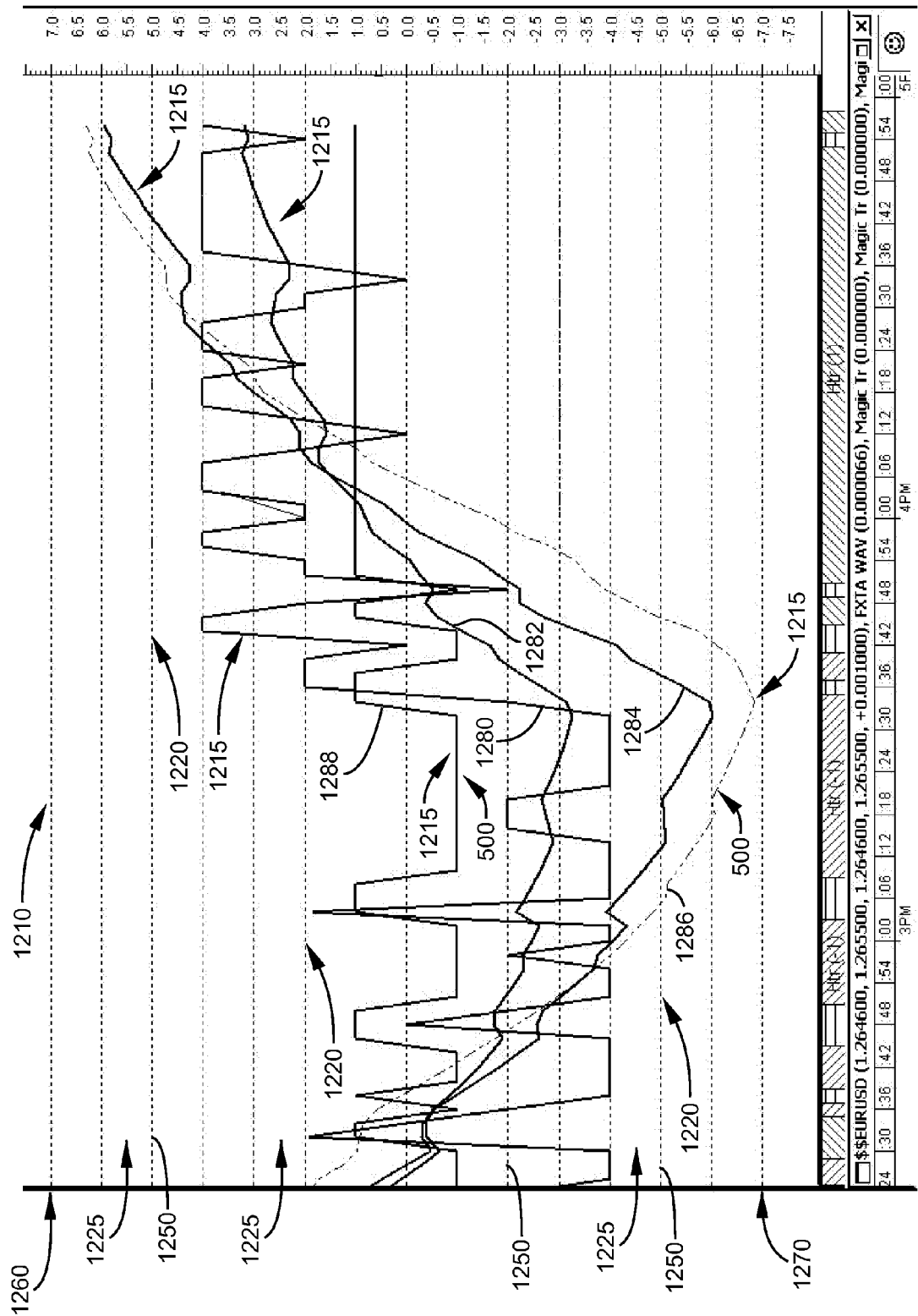
FIG. 4 shows a screenshot view, illustrating health risk dimension components, according to the preferred embodiment of FIG. 1.

FIG. 4 shows a screenshot view, illustrating health risk dimension components, according to the preferred embodiment of FIG. 1. Trend health risk 265 preferably uses indicators 500, preferably comprising at least one oscillating risk indicator 1210, preferably representing a dynamic oscillating risk assessment of a trend movement of upward, downward or sideways in trading of any market vehicle. Oscillating risk indicator 1210, within a preferably created, preferably adjustable boundary (boundary lines 1220) preferably locates a risk tolerance at any given time, in any time frame 325 for any market vehicles. This concept allows checking health of risk in the market on a variable adjustable scale.

Oscillating risk indicator 1210 preferably comprises at least two boundary lines 1220, preferably at least eleven boundary lines 1220. Oscillating risk indicator 1210 preferably further comprises at least one oscillating risk indicator component 1215, preferably at least five oscillating risk indicator components 1215. Upon reading the teachings of this specification, those skilled in the art will now appreciate that, under appropriate circumstances, considering such issues as user preference, cost, desired accuracy, etc., other quantities of boundary lines may suffice.

Boundary lines 1220 preferably comprise an uppermost boundary line 1230, a lowermost boundary line 1240 and core boundary lines 1250 of the Dynamic Oscillating Risk. The values vary, depending upon the risk associated with a particular market vehicle. Usually, the approximate values observed are between −7 to +7 for boundary lines 1220 for various types of Market vehicles. Boundary lines 1220 preferably define at least one risk area 1225.

The values of boundary lines 1220 from +6 and exceeding +6 preferably represent uppermost risk areas for bullish believers and lowermost risk areas for bearish believers (risk areas 1260), when any of five health risk indicator components 1215 are taken into consideration individually or combined. The values of boundary lines 1220 from −6 and less than −6 preferably represent uppermost risk areas for bearish believers and lowermost risk areas for bullish believers (risk areas 1270). Oscillating risk indicator 1210 in risk areas 1260 preferably indicates a near peak risk for bullish believers and entry points for bearish believers. Likewise, oscillating risk indicator 1210 in risk areas 1270 preferably indicates a near trough risk for bearish believers and entry points for bullish believers.

Oscillating risk indicator 1210 preferably may be displayed for multiple time frames 325, preferably in real time. Boundary line 1220 values preferably vary depending upon market conditions, type of market vehicle, and preferably may be plotted on vertical scale in a horizontal line format, as shown.

Health risk indicator component 1215 preferably comprises at least one positive/negative-indicator count 1280. Positive/negative-indicator count 1280 preferably comprises a non-zero integer value. Positive/negative-indicator count 1280 preferably comprises at least one summation of counts of positive and/or negative indicators. Such positive and/or negative indicators preferably include traditional indicators, alternately preferably modified indicators, alternately preferably specialty indicators, alternately preferably proprietary indicators. Each indicator increases count of positive/negative-indicator count 1280 by one, when positive, or decreases count of positive/negative-indicator count 1280 by one, when negative. Count of positive/negative-indicator count 1280 preferably comprises a maximum value equal to the number of indicators used and a minimum value equal to the number of indicators used in the negative. When positive/negative-indicator count 1280 drops below zero, it is considered that the health risk for a bullish direction is very high. When positive/negative-indicator count 1280 has a value equal to the minimum, it is considered that the market vehicle health risk for a bearish outlook is very good. Likewise, once positive/negative-indicator count 1280 increases above zero value, it is considered that the health risk is very high for a bearish outlook for a market vehicle. Also, when positive/negative-indicator count 1280 has a value equal to the maximum, it is considered that the market vehicle health risk for a bullish outlook is very good.

Another health risk indicator component 1215 preferably comprises at least one extreme risk indicator 1282. Extreme risk indicator 1282 is preferably designed to oscillate between the maximum and minimum polarity values indicated in positive/negative-indicator count 1280. Extreme risk indicator 1282 preferably comprises at least one algorithm written based on a set of traditional indicator methods, but derived from same family of indicators in positive/negative-indicator count 1280. In normal market conditions, the value of extreme risk indicator 1282 varies between about 3.5 and about −3.5. Any values greater than about 3.5, up to the maximum, indicate an extreme health risk issue for bullish entries, indicating possible reversals from a bullish to a bearish direction or profit takings Any values less than about −3.5, down to the minimum, indicate an extreme health risk issue for bearish entries, indicating possible reversals from a bearish to a bullish direction or profit takings Yet another health risk indicator component 1215 preferably comprises at least one strength risk indicator 1284. User 110 may preferably select the number of indicators, preferably comprising traditional indicators, alternately preferably proprietary indicators, alternately preferably custom indicators, as desired. User 110 may additionally preferably select the polarity, and modify such selected indicators for time delays errors. Further, strength risk indicator 1284 may preferably be customized to oscillate between and beyond a boundary, alternately preferably between boundaries to preferably measure the underlying strength. An extreme value of beyond or equal to about −6, using at least four indicators, preferably indicates possible extreme risk for bullish earlier entries and preferably indicates very high risk health for bearish believers. An extreme value of beyond or equal to about 6, using at least four indicators, may preferably indicates possible extreme risk for bearish earlier entries and preferably indicates very high risk health for bullish believers.

A further health risk indicator component 1215 preferably comprises at least one dynamic strength risk indicator 1286. Dynamic strength risk indicator 1286 preferably is designed similar to strength risk indicator 1284, however preferably from a selection of various dynamic values, which preferably allows dynamic strength risk indicator 1286 to function independent of strength risk indicator 1284. The independency preferably helps to avoid further lag errors in traditional or custom indictors used, as well as, earlier or later travel to extreme oscillating risk boundaries. Values of dynamic strength risk indicator 1286 preferably vary between about +7 and about −7, but may also vary from market vehicle to market vehicle depending upon behavioral patterns at the time of its life span.

Another health risk indicator component 1215 preferably comprises at least one internal health risk indicator 1288. Values of internal health risk indicator 1288 preferably vary between about +1 and about −1. If values of internal health risk indicator 1288 are about +1 and stays about +1, it preferably is an indication of a health risk that is likely to stay bullish. If values of internal health risk indicator 1288 fall from about +1 and stays below zero and reach to about −1 and then stays at a steady value of about −1, then values of internal health risk indicator 1288 are weak and preferably indicates the health risk for bullish believer has deteriorated and is confirmed. Likewise, if values of internal health risk indicator 1288 are about −1 and stays about −1, it preferably is an indication of a health risk that is likely to stay bearish. If values of internal health risk indicator 1288 rise from about −1 and stays above zero and reach to about +1 and then stays at a steady value of about +1, then values of internal health risk indicator 1288 are strong and preferably indicates the health risk for bearish believer has deteriorated and is confirmed. Internal health risk indicator 1288 may preferably be designed based on stepping desire values mixed with three different types of trend calculations.

Upon reading the teachings of this specification, those skilled in the art will now appreciate that, under appropriate circumstances, considering such issues as market vehicle, cost, etc., other health risk indicator components may suffice.

Health risk indicator components 1215 preferably have an inherent nature of synchronization with each other either preferably partially or, alternately preferably fully, when desired and adjusted by user 110. Strength risk indicator 1284 and dynamic strength risk indicator 1286, when synchronized and staying twisted together in upward direction, preferably indicate a strong possibility of continuity of upward trend. In addition, when extreme risk indicator 1282, strength risk indicator 1284 and dynamic strength risk indicator 1286 are synchronized together in an upward direction, it preferably indicates an even stronger upward strength possibility for bullish belief, until extreme risk indicator 1282 reaches a maximum. The relation of extreme risk indicator 1282, strength risk indicator 1284 and dynamic strength risk indicator 1286 for bearish belief exactly mirror bullish belief, as stated earlier. Once the polarity of positive/negative-indicator count 1280 and internal health risk indicator 1288 are equal, synchronization preferably occurs. If the polarity is positive for positive/negative-indicator count 1280 and internal health risk indicator 1288, then it preferably indicates a smooth strong bullish flow for believers. If the polarity is negative for positive/negative-indicator count 1280 and internal health risk indicator 1288, then it indicates a smooth strong bearish flow for believers.

Trend health risk 265 may preferably be represented in real time using the following type of formula:

$$3-\#(1), \text{MHRIC}-4\,(3.5)$$

where 3 is indicating that the current prices (either open, close, high, low—user choice) are in trend health risk 265. #(1) Indicates that the values of boundary lines 1220 fall between about +6 and about −6, a lowest oscillating risk bullish boundary level near trough, and MHRIC−4 (3.5) indicates that the value of MHRIC Component four (dynamic strength risk indicator 1286) is 3.5.

Figure 5:
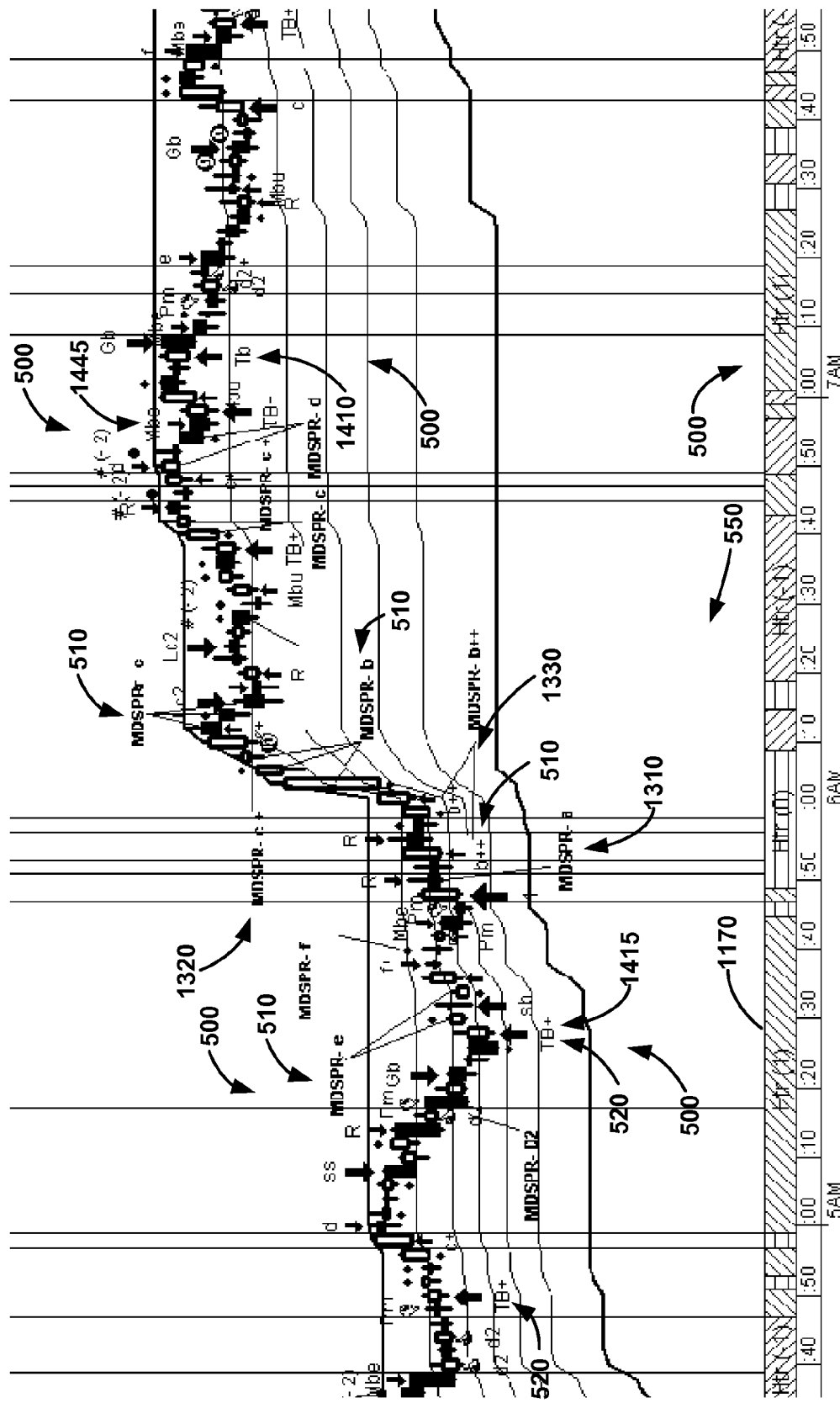
FIG. 5 shows a screenshot view, illustrating price perception indicators, according to the preferred embodiment of FIG. 1.

FIG. 5 shows a screenshot view, illustrating price perception indicators 510, according to the preferred embodiment of FIG. 1. Price perception risk 245 preferably comprises a perception of prices of a market vehicle. Price perception risk 245 preferably uses price perception indicators 510.

In price perception risk 245, the perception of prices in the market may preferably be categorized into at least one sectional category of risk, preferably at least six sectional categories of risk, attributed to Bullish, Bearish and/or mixed prices, preferably using at least one analysis tool 1320 comprising algorithms, alternately preferably indicators either custom or traditional, or alternately preferably oscillators, preferably where the primary factors are either open, low, high or close prices in the dynamic motion against time. Price perception risk 245 preferably is directly proportional to time, vertical movement of prices and repeating events. In an ideal world, any price movements must follow a dynamic sectional price risk path, preferably following at least one sequence of sections. Any deviation from such at least one sequence in sections preferably indicates sudden market changes, either adding more risk in trading or reducing risk in trading.

The price perception can be categorized based on its distance from a particular analysis tool. At least one bullish level preferably represents bullish belief above analysis tool and at least one bearish level preferably represents bearish belief below analysis tool. For descriptive purposes, such at least one bullish level is designated as section "a", section "b" and section "c"; likewise such at least one bearish level is designated as section "d", section "e" and section "f"

For design purposes, section "a" comprises the furthest lowest price perception for a bullish believer from a selected analysis tool, section "b" comprises the reasonable price perceptions accepted by the bullish believer for a market vehicle from a selected analysis tool 1320, for a selected time period, and section "c" comprises the furthest highest price perception by a bullish believer, for a market vehicle, over a selected time period. Price perception risk 245 for bullish believer may preferably fall in to section "a", section "b", or section "c". For ideal market behavior, the sequence must be section "a", then section "b", then section "c" for a bullish believer, making a bullish sequence.

Section "d" preferably comprises the furthest highest price perception below a selected analysis tool 1320 for a bullish believer, section "e" comprises the nearest highest price perception values for a bullish believer for a market vehicle below a selected analysis tool, for a selected time period, and section "f" comprises the furthest lowest price perception values for a bullish believer, for a market vehicle below a selected analysis tool, over a selected time period. Price perception risk 245 for bearish believer may preferably fall in to section "d", section "e", or section "f".

When a mix occurs of highest perception of prices and second lower perception of prices, prices are magnetized towards the current values of a selected analysis tool, and prices enter section "d" then returns to section "c" and repeats up to about 27 times, before prices are completely attracted to current value of a selected analysis tool.

In section "e", trader's perceptions are reasonably priced for taking risk to sell the market vehicle, as it is losing value suddenly. The trader's second perception is that, he will lose more value of market vehicle, if he holds them longer. A bullish believer reacts to sell its own inventory, plus any other opportunist's inventory, who make a similar decision based on such observation established in section "e". The time duration of section "e" is shorter in most cases and does not often happen in general bullish belief for market vehicle, but may happen, if some bad news or other factors in market exists and is used for taking profit.

In section "f", trader's perceptions are reasonably priced for eliminating risk by holding the market vehicle, as it loses value suddenly. The trader's second perception is that, he will lose the value of market vehicle further and financial damage could be far beyond normal, if he holds them any longer. The reaction of a bullish believer is to sell his own inventory, plus other opportunist's inventory, who make similar decision based on such observation of success established in section "f". The time duration of section "f" is shorter in most cases and does not often happen in general bullish belief for market vehicle, but may happen, if some bad news or some other factors in market does exist and by losing faith in the market vehicle.

Perception indicators 510 preferably differentiate between sections, and preferably indicate confirmations. Perception indicators 510 preferably use colors for differentiation, so for illustrative purposes have been labeled on FIG. 5. Confirmations in perception indicators 510 preferably are indicated through the use of "+" signs. Perception indicators 510 may preferably also utilize arrows to differentiate directionality.

Definitions of meaning of section labeling in examples shown in FIG. 5:

"MDSPR–a" (indicator label 1310): There are no catalysts and the market vehicle is in section "a".

"MDSPR–c+" (indicator label 1320): There is one catalysts and the market vehicle is in section "c"; this means user 110 may want to take a risk to go long, as there is a very low risk and is double confirmed.

"MDSPR–b++" (indicator label 1330): There are two catalysts and the market vehicle is in section "b"; this means user 110 may want to take a risk to go long, as there is a very low risk and is triple confirmed.

Upon reading the teachings of this specification, those skilled in the art will now appreciate that, under appropriate circumstances, considering such issues as clarity, cost, user preference, etc., other perception indicators, such as, for example, stars, numbers, letters, etc., may suffice.

Price perception risk 245 may preferably be represented in real time using the following type of formula:

$$4-\text{"MDSPR-b++"}$$

where 4 is indicating that the current prices (either open, close, high, low—user choice) are in price perception risk 245. MDSPR–b indicates that the values of price perception risk 245 are in category "b" for bullish believer on a current bar, and there are two additional catalyst confirmations in support of price perception risk 245 and the risk to go bullish is very low as there is a triple confirmation for bullish belief.

FIG. 6 shows a screenshot view, illustrating at least one internal movement indicator 520, according to the preferred embodiment of FIG. 1. Regardless, where the prices are, whether they are trending or not, or going sideways, there are risks associated with sudden market conditions changes, which can be located in any time frame, by inventing proper tools. In order to identify them, in real-time, in a particular time frame, during any trend development, consolidation, retracement, they need to be separated and highlighted or given special symbol. In addition, there are spots, where a well established trend looks great from outside on normal bar, candles, or line charts, but internally, the conditions are deteriorating, but they are not oblivious by looking at traditional methods or charts. So due to their sudden occurrence, it either costs the trader or causes missed opportunities. Internal market moving risk 215 preferably is displayed through internal movement indicator 520, which preferably show such conditions as they happen, alternately preferably warn user 110 well in advance of conditions happening, preferably working as a forecasting tools for future decision making in trading.

In this filing, applicant has modified the turquoise bars with additional market conditions to make them more efficient. A plus sign [+] indicates one modification, a double plus [++] shows two modifications to normal types.

For illustrative purposes, the following labels have been used in the drawings of this application to distinguish differently colored bars:

Turquoise Bar:–[Tb] (indicator 1410)
Turquoise Bar+:–[Tb+] (indicator 1415)
Golden Bar:–[GB] (indicator 1420)
Golden Bar+:–[Gb+] (indicator 1425)
Bull belief warning:–[Bw] (indicator 1430)
Bear belief warning:–[Bew] (indicator 1435)
Gray Bull:–[Mbu] (indicator 1440)
Pink Bear:–[Mbe] (indicator 1445)
Tdo Extended (–34) MHRIC Bull–[le] (indicator 1450)
Tdo Extended (+34) MHRIC Bear–[le(–)] (indicator 1455)
Neutral bar:–[Ne] (indicator 1460)
Future possible high:–[10] (indicator 1470)
Future possible low:–[9] (indicator 1475)

When a market vehicle has been sold for a long time or a short time, some traders believe that it is time to step in to the trade or do a trial/small test trade, even though prices are previously going against what they want to do. Alternately, institutions may make a decision that the market vehicles are reasonably priced to take a small amount of risk, or alternately, the institution's research department starts believing that, a particular market vehicle has a near term or medium term or long term potential in the direction research indicates, then the institution will try to test the market with the prices agreed in the research. In some cases, a technical department may also come with some recommendations, based on their analysis in one or multiple timer periods. Internal movement indicator 520 preferably shows events of internal movement of market, where an outside trading community has the least amount of warning. Bull belief warning (indicator 1430) and bear belief warning (indicator 1435) preferably indicate such warning.

Usually after formation of bull belief warning, in many cases, many traders start observing some directional movement in a specific time frame or alternately in several time frames, indicating a directional bullish movement has started taking place and a flow of orders starts coming in. Gray bull (indicator 1440) conditions are formed, which preferably is a low risk entry for the bullish direction, as the bullish belief gets converted into a bullish direction at first evidence.

Usually after formation of bear belief warning, in many cases, many traders starts observing some directional movement in a specific time frame or alternately in several time frames, indicating a directional bullish movement has started taking place and a flow of orders starts coming in. Pink bear (indicator 1445) conditions are formed, which preferably is a low risk entry for bearish direction, as the bearish belief gets converted in to a bearish direction at first evidence.

Tdo Extended (–34) MHRIC Bull (indicator 1450) and Tdo Extended (+34) MHRIC Bear (indicator 1455) are preferably created using various components of price perception risk 245, preferably providing better entries for bullish belief or bearish belief and per the location of those components. At least one indicator maybe used to find an extended location with no time delays factors. Using internal market moving risk 215 preferably reduces risk for the entry either for bullish believers or bearish believers.

Internal market moving risk 215 preferably comprises multi-dimensional bull entry (indicator 1480) and multi-dimensional bear entry (indicator 1485), which preferably is based on multiple confirmations of multiple dimensions as per user selection in a design; this may preferably give user 110 an entry based on a risk assessed overall based on many factors, not only on one particular component of a selected dimension or a single dimension.

Internal market moving risk 215 preferably additionally indicates when there is an equilibrium between bullish believers and bearish believers in a particular time frame, at a peculiar level or range of levels, using one or more dimensions, by utilizing a neutral bar (indicator 1460). Neutral bar (indicator 1460) preferably indicates that the direction can go either way. Neutral bar preferably shows an area of equilibrium, with a pinpoint neutral bar location timing.

Using the components of multiple dimensions, as discussed in this application, future possible highs (indicator 1470) and future possible lows (indicator 1475), are preferably designated as "risk conditions are met" for extensions from that point.

Internal market moving risk 215 may preferably be represented in real time using the following type of formula:

$$5\text{-SMSMCR-7h, 5h, 1+}$$

where 5 is indicating that the current prices (either open, close, high, low—user choice) are in internal market moving risk 215, SMSMCR–7h, 5h, 1+ indicates that there are multiple sudden market conditions going on at the same time, 7h indicates that future possible highs are possible, 5h indicates that a Tdo 55 Extended (–34) MHRIC bull condition exists, 1+ indicates that there is a Turquoise Bar+ condition existing, where Turquoise bar itself has an additional one more confirmation, therefore SMSMCR–7h, 5h, 1+ has six confirmations in bullish direction and the risk is very low to step in as a bullish believer.

Additionally, there are many events in trading, which occur due to satisfying several conditions at a same time or series of conditions met on a sequential basis. Traders look at them happening, confirming manually and then make informal decisions to trade, but the manual process of confirming is insufficient in trading quickly and sequencing them manually is a difficult and time consuming process. Multiple conditions risk 235 preferably comprises an automatic sequencing and confirmation of multiple conditions, which derive special meaning and indications for trading, in real-time. Indicators for multiple conditions risk 235 preferably take out the time consuming process of manual handling of special conditions and special conditional sequences. Some of these special conditions can be designed by using the various methods of analysis of market risks 205, as detailed within the teachings of this specification, using traditional indicators, patterns, oscillators, etc., to preferably develop special conditional risk indicators.

Multiple conditions risk 235 may preferably be represented in real time using the following type of formula:

6–[SCMR–6]/[SCMR–1]/[SCMR–13A]**

Where 6 is indicating that the current prices (either open, close, high, low—user choice) are in multiple conditions risk 235, [SCMR–6] indicates that there is a bull rare entry on daily chart, which is a bullish belief, [SCMR–1] indicates that there is a turquoise bar formed on current time frame; this is a bullish belief, [SCMR–13 A] indicates that there is PdM-Bear situation, ** indicates conflict due to [SCMR–13 A], as it is in a bear condition.

There are many types of fundamental economical risk (economic event risk 225) identified over the period of time preferably comprising interest rate risk, employment data risk, current accounts risks, payroll reports, trade balance, manufacturing numbers, PPI, CPI, home sales, GDP prices, construction spending, earning reports, inventories, and durable goods. Upon reading the teachings of this specification, those skilled in the art will now appreciate that, under appropriate circumstances, considering such issues as future economic reports, costs, etc., other fundamental economic risks, such as, for example, price rank, group rank, P/E Ratio, debt/equity ratio, date of earning, earning growth, projected earnings, earning estimate, growth ratio, rank of earning, accumulation and distributions, cash flow and its growth, insider trading, dividend, outstanding number of shares, dividend yields, may suffice.

Economic event risk 225 preferably addresses erratic movement in the market from related to the fundamental economical risks as they occur. User 110 may preferably have an automatic notification on the software, preferably by alert, preferably at the time of it happens or alternately preferably pre-program and shown during normal trading. Additionally, economical event of the past may preferably be plotted preferably by having it programmed as an indicator and superimposing it to the price charts or, alternately preferably by making a separate fundamental health risk dimension.

Economic event risk 225 may preferably be represented in real time using the following type of formula:

7–[GDP–1]/[PPI–1] US 1/30/09 830 AMEST–Htr(1) D(3)

where 7 is indicating that the current prices (either open, close, high, low—user choice) are in economic event risk 225, GDP indicates that there is GDP economical number due at 8:30 AM EST for USA on Jan. 30, 2009, PPI producer price Index for USA will be announced at 8:30 AM EST on Jan. 30, 2009, Htr(1)D indicates that the current dimensional spectrum is bullish on a daily chart for last three days.

In FIG. 5, multi-dimensional confirmations are shown. By using multiple dimensions (zone range risk 275, time duration risk 255, trend health risk 265, price perception risk 245, internal market moving risk 215, multiple conditions risk 235, economic event risk 225) together, user 110 preferably receives real-time multi-dimensional confirmations, comprising multiple sources of market vehicle influences.

At least one multi-dimensional indication 550, as shown in FIG. 5, shows a combination of indicator label 1330, internal movement indicator 520 and fixed time spectrum ribbon 1170;

each are strong indications for bullish believers, and together provide multidimensional confirmation. Multi-dimensional indications 550 are preferably applied to time frame charts starting from ticks to multiple-minute charts. Variables, such as last value, highest sum, and time frame location compared to bigger time frame, specific values of market vehicle on a specific selected time frame, values when specific conditions met, cumulative values, absolute values for cumulative specific conditions, combinations of cumulative values, and values at specific combinations and other user choice of conditions, may be used.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A computer system, relating to real-time market analysis, comprising:
   (a) at least one market feed computer processor structured and arranged to process at least one real-time market feed to determine real-time market data;
   (b) at least one risk factor computer processor structured and arranged to automatically calculate current values of each of a plurality of market risk factors from such real-time market data, wherein said at least one risk factor computer processor comprises at least one of:
      (i) at least one bounded range risk computer processor structured and arranged to automatically calculate current values of at least one historic value range boundary risk factor;
      (ii) at least one time-duration risk computer processor structured and arranged to automatically calculate current values of at least one time-duration risk factor;
      (iii) at least one trend health risk computer processor structured and arranged to automatically calculate current values of at least one trend health risk factor;
      (iv) at least one price-perception computer risk processor structured and arranged to automatically calculate current values of at least one price-perception risk factor;
      (v) at least one internal-market-movement risk computer processor structured and arranged to automatically calculate current values of at least one internal-market-movement risk factor;
      (vi) at least one economic-event risk computer processor structured and arranged to automatically calculate current values of at least one economic-event risk factor; and
      (vii) at least one multiple-conditions risk computer processor structured and arranged to automatically calculate current values of at least one multiple condition risk factor;
   (c) at least one analysis computer processor structured and arranged to real-time analyze at least one combination of such market risk factors to quantify at least one market risk;
   (d) at least one risk assessing computer processor structured and arranged to assess relevance of each quantity of a plurality of such at least one market risks to determine when to display at least one risk indicator; and
   (e) at least one risk indicator computer display structured and arranged to display such at least one risk indicator.

2. The computer system according to claim 1 further comprising at least one risk factor computer display structured and arranged to display at least some of such current values of such plurality of market risk factors.

3. The computer system according to claim 1 further comprising at least one time-frame computer processor structured and arranged to calculate each of such plurality of market risk factors relating to each of a plurality of time frames ending at about current real-time.

4. The computer system according to claim 3 further comprising at least one time-frame computer display structured and arranged to display, relating to each of such plurality of time frames, at least some of such current values of such plurality of market risk factors.

5. The computer system according to claim 1 wherein said at least one analysis computer processor analyzes at least one combination of such current values of such at least one historic value range boundary risk factor to determine when to display at least one historic value range boundary risk indicator.

6. The computer system according to claim 1 wherein said at least one analysis computer processor analyzes at least one combination of such current values of such at least one time-duration risk factor to determine when to display at least one historic value range boundary risk indicator.

7. The computer system according to claim 1 wherein said at least one analysis computer processor analyzes at least one combination of such current values of such at least one trend health risk factor to determine when to display at least one trend health risk indicator.

8. The computer system according to claim 1 wherein said at least one risk factor computer display comprises at least one summation of at least one count of positively showing of such plurality of market risk factors and at least one negative count of negatively showing of such plurality of market risk factors.

9. The computer system according to claim 1 wherein said at least one analysis computer processor analyzes at least one combination of such current values of such at least one price-perception risk factor to determine when to display at least one price-perception risk indicator.

10. The computer system according to claim 1 wherein said at least one analysis computer processor analyzes at least one combination of such current values of at least one internal-market-movement risk factor to determine when to display such at least one internal-market-movement risk indicator.

11. The computer system according to claim 1 wherein said at least one analysis computer processor analyzes at least one combination of such current values of such at least one economic-event risk factor to determine when to display at least one economic-event risk indicator.

12. The computer system according to claim 1 wherein said at least one analysis computer processor analyzes at least one combination of such current values of such at least one multiple-conditions risk factor to determine when to display at least one multiple-conditions risk indicator.

13. A computer method, relating to real-time market analysis, comprising the steps of: a) processing, by at least one computer, at least one real-time market feed to determine real-time market data; (b) automatically calculating, by such at least one computer, current values of each of a plurality of market risk factors from such real-time market data, wherein such step of automatically calculating, by such at least one computer, current values of each of a plurality of market risk factors comprises at least one of the following steps:
 (i) automatically calculating, by such at least one computer, current values of at least one historic value range boundary risk factor;
 (ii) automatically calculating, by such at least one computer, current values of at least one time-duration risk factor;
 (iii) automatically calculating, by such at least one computer, current values of at least one trend health risk factor;
 (iv) automatically calculating, by such at least one computer, current values of at least one price-perception risk factor;
 (v) automatically calculating, by such at least one computer, current values of at least one internal-market-movement risk factor;
 (vi) automatically calculating, by such at least one computer, current values of at least one economic-event risk factor; and
 (vii) automatically calculating, by such at least one computer, current values of at least one multiple condition risk factor;
(c) real-time analyzing, by such at least one computer, at least one combination of such market risk factors to quantify at least one market risk;
(d) assessing relevance, by such at least one computer, of each quantity of a plurality of such at least one market risks to determine when to display at least one risk indicator; and
(e) displaying, by such at least one computer, such at least one risk indicator.

14. The computer method according to claim 13 further comprising the step of displaying, by such at least one computer, at least some of such current values of such plurality of market risk factors.

15. The computer method according to claim 13 further comprising the step of calculating, by such at least one computer, each of such plurality of market risk factors relating to each of a plurality of time frames ending at about current real-time.

16. The computer method according to claim 13 further comprising the step of displaying, relating to each of such plurality of time frames, at least some of such current values of such plurality of market risk factors, by such at least one computer.

17. A computer system, relating to real-time market analysis, comprising:
 a) means for processing at least one real-time market feed to determine real-time market data;
 b) means for automatically calculating current values of each of a plurality of market risk factors from such real-time market data, wherein said means for automatically calculating current values of each of a plurality of market risk factors from such real-time market data comprises at least one of:
 (i) means for automatically calculating current values of at least one historic value range boundary risk factor;
 (ii) means for automatically calculating current values of at least one time-duration risk factor:
 (iii) means for automatically calculating current values of at least one trend health risk factor:
 (iv) means for automatically calculating current values of at least one price-perception risk factor;
 (v) means for automatically calculating current values of at least one internal-market- movement risk factor;
 (vi) means for automatically calculating current values of at least one economic-event risk factor; and
 (vii) means for automatically calculating current values of at least one multiple condition risk factor;
 c) means for real-time analyzing at least one combination of such market risk factors to quantify at least one market risk;

d) means for assessing relevance of each quantity of a plurality of such at least one market risks to determine when to display at least one risk indicator; and e) means for displaying such at least one risk indicator.

18. The computer system according to claim 17 further comprising means for displaying at least some of such current values of such plurality of market risk factors.

19. The computer system according to claim 17 further comprising means for calculating each of such plurality of market risk factors relating to each of a plurality of time frames ending at about current real-time.

20. The computer system according to claim 17 further comprising means for displaying, relating to each of such plurality of time frames, at least some of such current values of such plurality of market risk factors.

* * * * *